United States Patent
Riveland et al.

(10) Patent No.: US 11,333,115 B2
(45) Date of Patent: May 17, 2022

(54) FUEL RECIRCULATION METHOD AND VALVE

(71) Applicant: Clark Equipment Company, West Fargo, ND (US)

(72) Inventors: Shaun Riveland, Bismarck, ND (US); Ryan Wenz, Bismarck, ND (US); Brandon Kisse, Bismarck, ND (US); Justin Muscha, Regan, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 0 days.

(21) Appl. No.: 15/380,531

(22) Filed: Dec. 15, 2016

(65) Prior Publication Data
US 2017/0175691 A1 Jun. 22, 2017

Related U.S. Application Data

(60) Provisional application No. 62/268,232, filed on Dec. 16, 2015.

(51) Int. Cl.
| | | |
|---|---|---|
| *F02M 37/00* | (2006.01) | |
| *F02M 37/04* | (2006.01) | |
| *F02M 37/32* | (2019.01) | |
| *B62D 49/00* | (2006.01) | |
| *F16K 11/10* | (2006.01) | |

(Continued)

(52) U.S. Cl.
CPC ...... *F02M 37/0035* (2013.01); *F02M 37/007* (2013.01); *F02M 37/0052* (2013.01); *F02M 37/04* (2013.01); *F02M 37/32* (2019.01); *F16K 11/10* (2013.01); *F16K 11/14* (2013.01); *F16K 31/002* (2013.01); *G05D 23/134* (2013.01);

(Continued)

(58) Field of Classification Search
CPC .. F02M 37/0035; F02M 21/023; F02M 37/22; F02M 37/04; F02M 37/0052; F02M 37/007; F16K 11/22; F16K 31/002; G05D 23/134; G05D 23/1333; G05D 23/1346; Y10T 137/7737; F02D 19/081
USPC .......................................... 123/495; 137/468
See application file for complete search history.

(56) References Cited

U.S. PATENT DOCUMENTS 2,083,876 A * 6/1937 Snediker ............ G05D 23/1346
236/12.22
4,300,489 A * 11/1981 Perrin ...................... F01M 1/16
116/277

(Continued)

*Primary Examiner* — Logan M Kraft
*Assistant Examiner* — Joshua Campbell
(74) *Attorney, Agent, or Firm* — John Veldhuis-Kroeze; Westman, Champlin & Koehler, P.A.

(57) ABSTRACT

Fuel recirculation methods, fuel supply circuits and fuel recirculation valves for selectively mixing hot return fuel from a diesel engine with fuel from a tank before providing it to back to the engine. In exemplary disclosed embodiments of fuel recirculation valves, the valves are configured to selectively mix the fuel in a controlled manner using a temperature sensitive actuator within the valve such that, when the temperature of the fuel reaches a certain point, the valve restricts flow pathways to reduce heated fuel being mixed with fuel from the fuel tank, and eventually closes to prevent any heated fuel from being mixed and overheating the fuel provided to a fuel filter, a fuel pump and the engine. Disclosed fuel circulation valves are separate from the fuel filter and are placed upstream of the filter.

3 Claims, 8 Drawing Sheets

(51) Int. Cl.
 *G05D 23/13* (2006.01)
 *F16K 11/14* (2006.01)
 *F16K 31/00* (2006.01)

(52) U.S. Cl.
 CPC ..... *G05D 23/1333* (2013.01); *G05D 23/1346* (2013.01); *Y10T 137/7737* (2015.04)

(56) References Cited

U.S. PATENT DOCUMENTS

| | | | | |
|---|---|---|---|---|
| 4,454,848 | A * | 6/1984 | Duprez | F02M 31/16 123/516 |
| 5,983,863 | A * | 11/1999 | Cavanagh | F02D 41/20 123/447 |
| 6,058,964 | A * | 5/2000 | Cotton | F02M 37/04 123/509 |
| 6,253,740 | B1 * | 7/2001 | Rembold | F02M 37/34 123/509 |
| 7,028,672 | B2 * | 4/2006 | Glenz | F02M 43/00 123/514 |
| 9,163,596 | B2 | 10/2015 | Fisher et al. | |
| 2003/0121865 | A1 * | 7/2003 | Winn | F02M 37/44 210/739 |
| 2011/0271672 | A1 * | 11/2011 | Donkin | F02B 21/00 60/602 |

\* cited by examiner

FUEL RECIRCULATION METHOD AND VALVE

CROSS-REFERENCE TO RELATED APPLICATION

This application claims the benefit of U.S. Provisional Application No. 62/268,232, filed Dec. 16, 2015.

BACKGROUND

The present disclosure is directed toward fuel circuits for providing fuel to internal combustion engines such as diesel engines. More particularly, the present disclosure is directed toward systems and methods for recirculating fuel returned from an engine and combining returned fuel with fuel drawn from a fuel tank to provide an adequate fuel supply to the engine.

In cold temperatures, paraffin material, known in the industry generally as paraffins and that is suspended in diesel fuel as a part of diesel fuel, tends to solidify, which causes it to plug fuel filters. Fuel recirculation valves are operable to mix returning fuel from the engine with fuel from the tank (e.g., in about a 9:1 ratio) to warm the fuel provided to the engine, or more particularly, to the fuel filter to prevent such plugging. Prior art recirculation valves are typically located in a fuel filter container and downstream of the fuel filter such that the fuel from the tank is filtered and then mixed with fuel returned from the engine. Thus, to make changes and improvements to the recirculation valve, fuel filter redesign may be necessary. Further, improvements to the fuel recirculation valve may need to be specifically tailored to different fuel supply circuits or fuel filters of various different engine or vehicle designs.

In mixing returning fuel from the engine with fuel from the tank, fuel recirculation valves can warm the fuel from the tank beyond a desired temperature. This can in turn affect performance of the fuel recirculation system components or the engine.

The discussion above is merely provided for general background information and is not intended to be used as an aid in determining the scope of the claimed subject matter.

SUMMARY

This Summary and the Abstract are provided to introduce a selection of concepts that are disclosed in the Detailed Description in a simplified form. The Summary and the Abstract are not intended to identify key features or essential features of the claimed subject matter, nor are they intended to be used as an aid in determining the scope of the claimed subject matter.

Fuel recirculation methods, fuel recirculation circuits and fuel recirculation valves for selectively mixing hot return fuel from a diesel engine with fuel from a tank before providing it to back to the engine are discussed herein. In one embodiment, a fuel recirculation valve is disclosed for use in a fuel supply circuit that fuel to an engine. The fuel recirculation valve includes a body having first inlet configured to receive fuel into the body from a first source and a second inlet configured to receive fuel into the body from a second source. The body also has an outlet configured to allow fuel to exit the body. A first passage in the body connects the first inlet to the outlet. The first passage has a first portion in communication with the first inlet, a second portion in communication with the outlet, and a middle portion between the first portion and the second portion. The first passage provides a path for fuel from the first source to travel from the first inlet to the outlet. A second passage in the body connects the second inlet to the first passage at a node positioned between the first inlet and the middle portion of the first passage. The second passage provides a path for fuel from the second source to travel from the second inlet to the node so that fuel from the second source is capable of being mixed with the fuel from the first source at the node.

In another embodiment, a fuel supply circuit for supplying fuel to an engine is disclosed. The fuel supply circuit includes a reservoir for holding fuel and a fuel pump that has an engine interface for providing pressurized fuel to the engine and receiving unused fuel returned from the engine as well as an inlet for receiving fuel from the reservoir and an outlet for returning the unused fuel from the engine to the reservoir. The fuel supply circuit has an inlet path between the reservoir and the fuel pump, including a fuel filter package having a fuel filter and a fuel recirculation valve located upstream and outside of the fuel filter package. The fuel supply circuit also has an outlet path between the fuel pump and the reservoir including a branch connection device capable of providing at least a portion of the unused fuel to the fuel recirculation valve.

Yet another embodiment discloses a power machine having a frame, an engine mounted to the frame and a fuel supply circuit for supplying fuel to the engine. The fuel supply circuit includes a reservoir for holding fuel, a fuel pump for supplying fuel to and receiving unused fuel from the engine, an inlet path between the reservoir and the fuel pump, and an outlet path between the fuel pump and the reservoir. The inlet path includes a fuel filter and a fuel recirculation valve positioned upstream and external to the fuel filter. The fuel recirculation valve has a first inlet for receiving fuel from the reservoir, an outlet in communication with the fuel filter, and a second inlet. The outlet path includes a branch connection device capable of providing at least a portion of the unused fuel via a conduit to the second input fuel recirculation valve.

DETAILED DESCRIPTION OF ILLUSTRATIVE EMBODIMENTS

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed are fuel recirculation methods, fuel recirculation circuits and fuel recirculation valves for selectively mixing return fuel from a diesel engine with fuel from a tank before providing it to back to the engine. In exemplary disclosed embodiments of fuel recirculation valves, the valves are configured to selectively mix the fuel in a controlled manner using a temperature sensitive actuator within the valve. When the temperature of the fuel reaches a certain point, the temperature sensitive actuator causes the valve to narrow flow pathways and eventually close to prevent overheating of the fuel. Also, in disclosed embodiments, the fuel circulation valve is designed to be separate from the fuel filter and not integrated into a filter package. This allows the fuel to be mixed before entering the filter and allows disclosed fuel recirculation valves to be added to any fuel supply circuit, regardless of the type of filter that the system uses. Thus, disclosed fuel recirculation valves are beneficial for retrofitting a variety of existing fuel supply circuits and systems.

These concepts can be practiced on various power machines, as will be described below. However, the presently disclosed methods, fuel recirculation valves, and concepts can be practiced in fuels systems of machines other than power machines. While a representative power machine on which the embodiments can be practiced is illustrated in diagram form in FIG. 1, it must be understood that disclosed embodiments are not limited to use on the representative power machine or on power machines in general.

Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
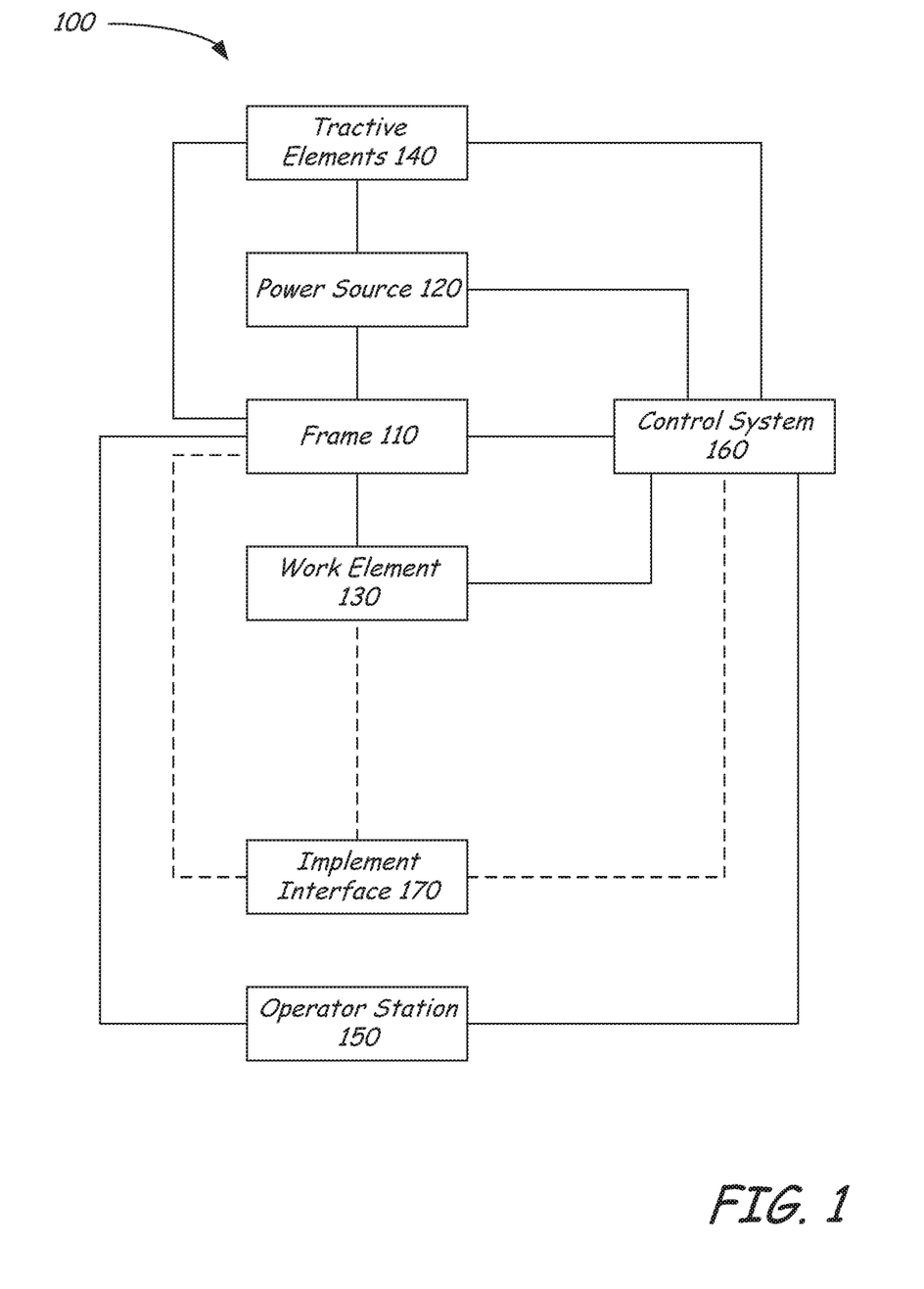
FIG. 1 is a block diagram illustrating functional systems of a representative power machine on which embodiments of the present disclosure can be advantageously practiced.

FIG. 1 illustrates a block diagram illustrates the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function.

Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources. In exemplary embodiments, power source 120 includes a diesel engine and a fuel supply circuit which uses a fuel recirculation valve as described herein to mix return fuel from the engine with fuel from the fuel tank.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent to or on the power machine. This can include applications where at least some of the operator controlled functions of the power machine can be operated from an operating position associated with an implement that is coupled to the power machine. Alternatively, with some power machines, a remote control device can be provided (i.e. remote from both of the power machine and any implement to which is it coupled) that is capable of controlling at least some of the operator controlled functions on the power machine.

Figure 2:
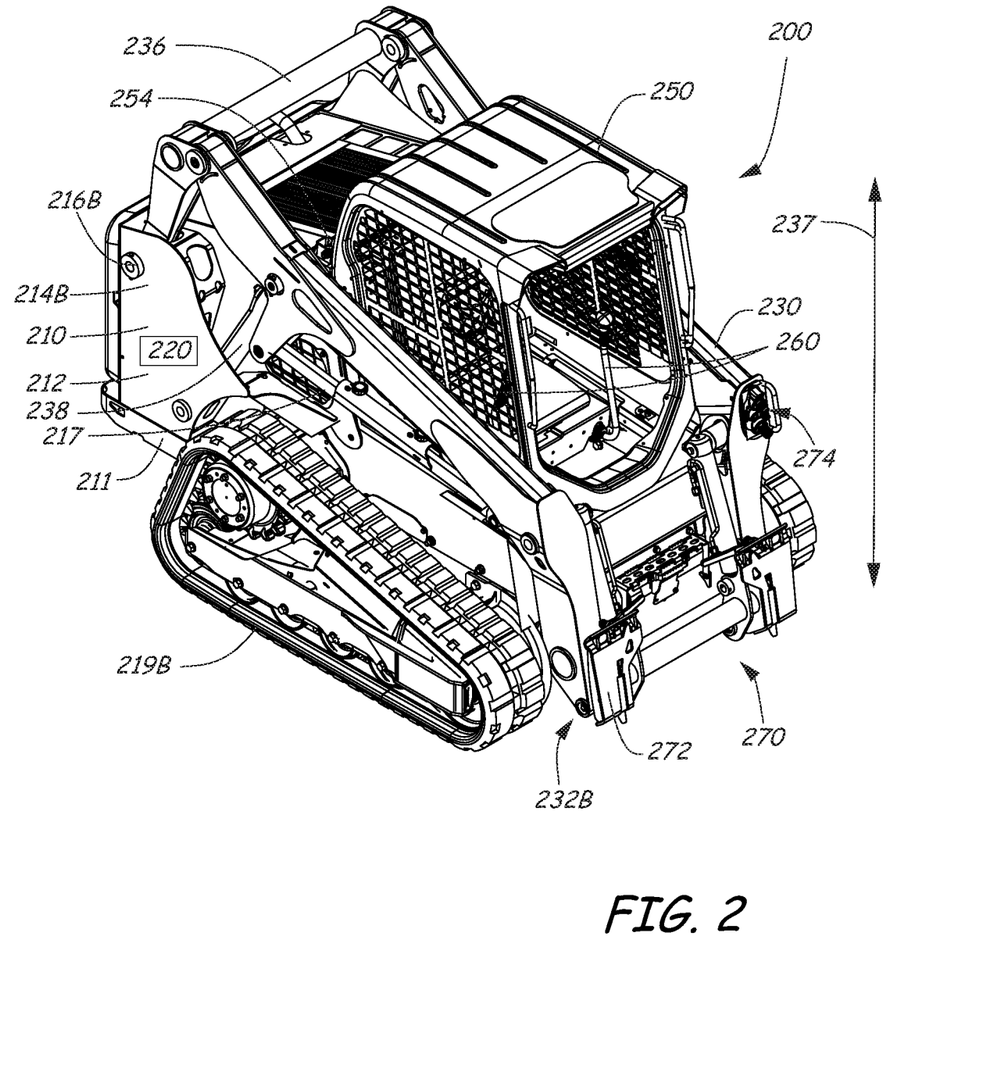
FIGS. 2-3 illustrate perspective views of a power machine on which a fuel delivery system having a fuel recirculation valve according to embodiments discussed herein can be advantageously practiced.
Figure 3:
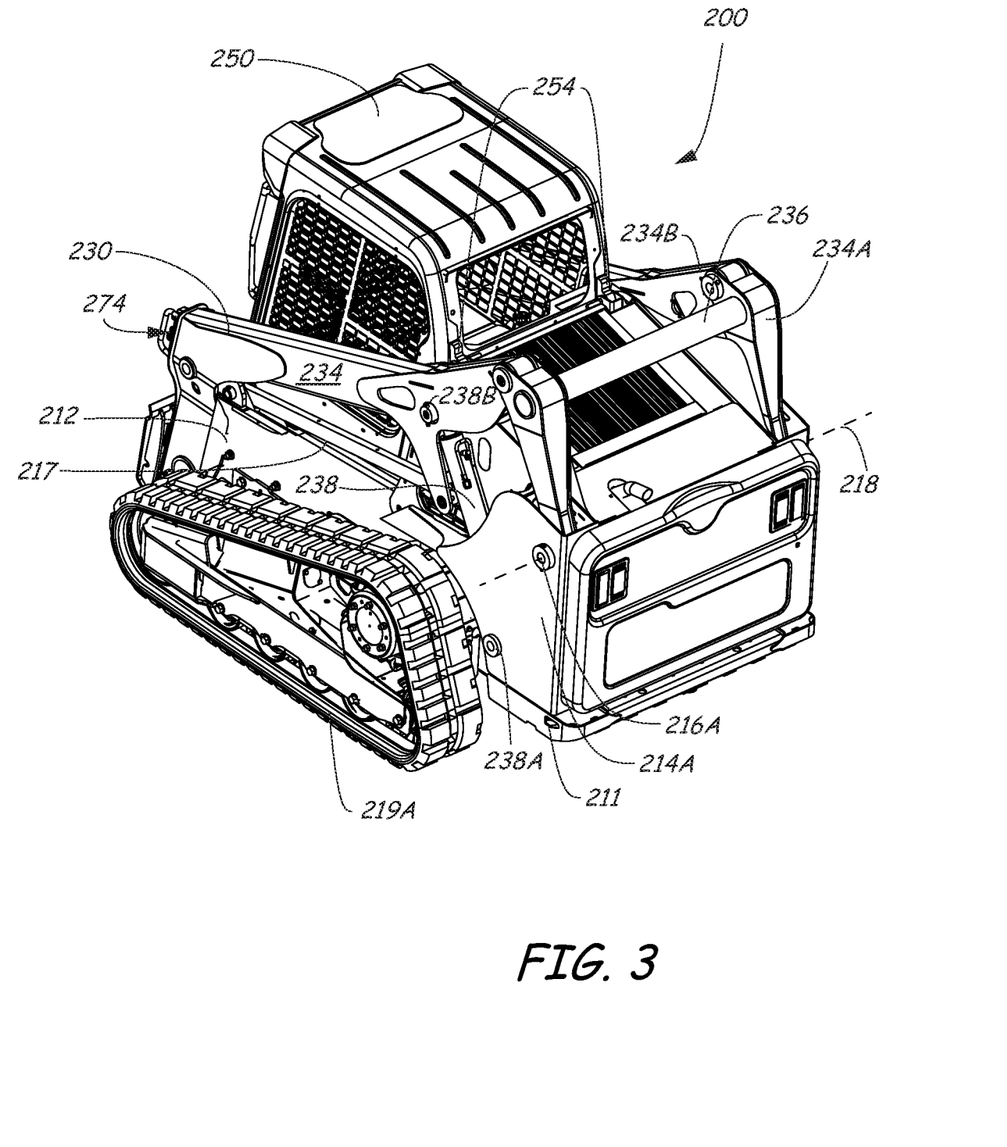

FIGS. 2-3 illustrate a loader 200, which is one particular example of a power machine of the type illustrated in FIG. 1 where the embodiments discussed below can be advantageously employed. Loader 200 is a track loader and more particularly, a compact tracked loader. A track loader is a loader that has endless tracks as tractive elements (as opposed to wheels). Other loaders can have wheels instead of tracks. Track loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Track loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the track loader 200 being only one of those power machines. For example, some or all of the concepts discussed below can be practiced on many other types of track work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 illustratively includes an internal combustion engine of the type that can benefit from a fuel supply circuit that uses a fuel recirculation valve to mix return fuel from the engine with fuel from the fuel tank before supplying the mixed fuel to the engine. Frame 210 also supports a work element in the form of a lift arm structure 230 that is powered by the power system 220 and is capable of performing various work tasks. As loader 200 is a work vehicle, frame 210 also supports a traction system 240, which is also powered by power system 220 and is capable of propelling the power machine over a support surface. The lift arm structure 230 in turn supports an implement carrier interface 270, which includes an implement carrier 272 that is capable of receiving and securing various implements to the loader 200 for performing various work tasks and power couplers 274, which are provided to selective provide power to an implement that might be connected to the loader. The loader 200 can be operated from within a cab 250 from which an operator can manipulate various control devices 260 to cause the power machine to perform various functions. Cab 250 can be pivoted back about an axis that extends through mounts 254 to access components as needed for maintenance and repair.

Various power machines that are capable of including and/or interacting with the embodiments discussed below can have various different frame components that support various work elements. The elements of frame 210 discussed herein are provided for illustrative purposes and should not be considered to be the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200 is attached to the undercarriage 211 such as with fasteners or by welding the undercarriage to the mainframe. Mainframe 212 includes a pair of upright portions 214A and 214B located on either side and toward the rear of the mainframe that support lift arm structure 230 and to which the lift arm structure 230 is pivotally attached. The lift arm structure 230 is illustratively pinned to each of the upright portions 214A and 214B. The combination of mounting features on the upright portions 214A and 214B and the lift arm structure 230 and mounting hardware (including pins used to pin the lift arm structure to the mainframe 212) are collectively referred to as joints 216A and 216B (one is located on each of the upright portions 214) for the purposes of this discussion. Joints 216A and 216B are aligned along an axis 218 so that the lift arm structure is capable of pivoting, as discussed below, with respect to the frame 210 about axis 218. Other power machines may not include upright portions on either side of the frame, or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements 219A and 219B on either side of the loader 200, which on loader 200 are track assemblies.

The lift arm structure 230 shown in FIG. 1 is one example of many different types of lift arm structures that can be attached to a power machine such as loader 200 or other power machines on which embodiments of the present discussion can be practiced. The lift arm structure 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. The lift arm structure 230 is moveable (i.e. the lift arm structure can be raised and lowered) under control of the loader 200 with respect to the frame 210. That movement (i.e. the raising and lowering of the lift arm structure 230) is described by a travel path, shown generally by arrow 237. For the purposes of this discussion, the travel path 237 of the lift arm structure 230 is defined by the path of movement of the second end 232B of the lift arm structure.

Each of the lift arms 234 of lift arm structure 230 as shown in FIG. 2 includes a first portion 234A and a second portion 234B that is pivotally coupled to the first portion 234A. The first portion 234A of each lift arm 234 is pivotally coupled to the frame 210 at one of the joints 216 and the second portion 234B extends from its connection to the first portion 234A to the second end 232B of the lift arm structure 230. The lift arms 234 are each coupled to a cross member 236 that is attached to the first portions 234A. Cross member 236 provides increased structural stability to the lift arm structure 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm structure 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed travel path of the lift arm structure 230. The lift arm structure 230 shown in FIG. 2 is representative of one type of lift arm structure that may be coupled to the power machine 100. Other lift arm structures, with different geometries, components, and arrangements can be pivotally coupled to the loader 200 or other power machines upon which the embodiments discussed herein can be practiced without departing from the scope of the present discussion. For example, other machines can have lift arm structures with lift arms that each has one portion (as opposed to the two portions 234A and 234B of lift arm 234) that is pivotally coupled to a frame at one end with the other end being positioned in front of the frame. Other lift arm structures can have an extendable or telescoping lift arm. Still other lift arm structures can have several (i.e. more than two) portions segments or portions. Some lift arms, most notably lift arms on excavators but also possible on loaders, may have portions that are controllable to pivot with respect to another segment instead of moving in concert (i.e. along a pre-determined path) as is the case in the lift arm structure 230 shown in FIG. 2. Some power machines have lift arm structures with a single lift arm, such as is known in excavators or even some loaders and other power machines. Other power machines can have a plurality of lift arm structures, each being independent of the other(s).

Implement interface 270 is provided at a second end 234B of the arm 234. The implement interface 270 includes an implement carrier 272 that is capable of accepting and securing a variety of different implements to the lift arm 230. Such implements have a machine interface that is configured to be engaged with the implement carrier 272. The implement carrier 272 is pivotally mounted to the second end 234B of the arm 234. Implement carrier actuators are operably coupled the lift arm structure 230 and the implement carrier 272 and are operable to rotate the implement carrier with respect to the lift arm structure.

The implement interface 270 also includes an implement power source 274 available for connection to an implement on the lift arm structure 230. The implement power source 274 includes pressurized hydraulic fluid port to which an implement can be coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

The lower frame 211 supports and has attached to it a pair of tractive elements 219A and 219B. Each of the tractive elements 219A and 219B has a track frame that is coupled to the lower frame 211. The track frame supports and is surrounded by an endless track, which rotates under power to propel the loader 200 over a support surface. Various elements are coupled to or otherwise supported by the track frame for engaging and supporting the endless track and cause it to rotate about the track frame. For example, a sprocket is supported by the track frame and engages the endless track to cause the endless track to rotate about the track frame. An idler is held against the track by a tensioner (not shown) to maintain proper tension on the track. The track frame also supports a plurality of rollers, which engage the track and, through the track, the support surface to support and distribute the weight of the loader 200.

Loaders can include human-machine interfaces including display devices that are provided in the cab to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 4:
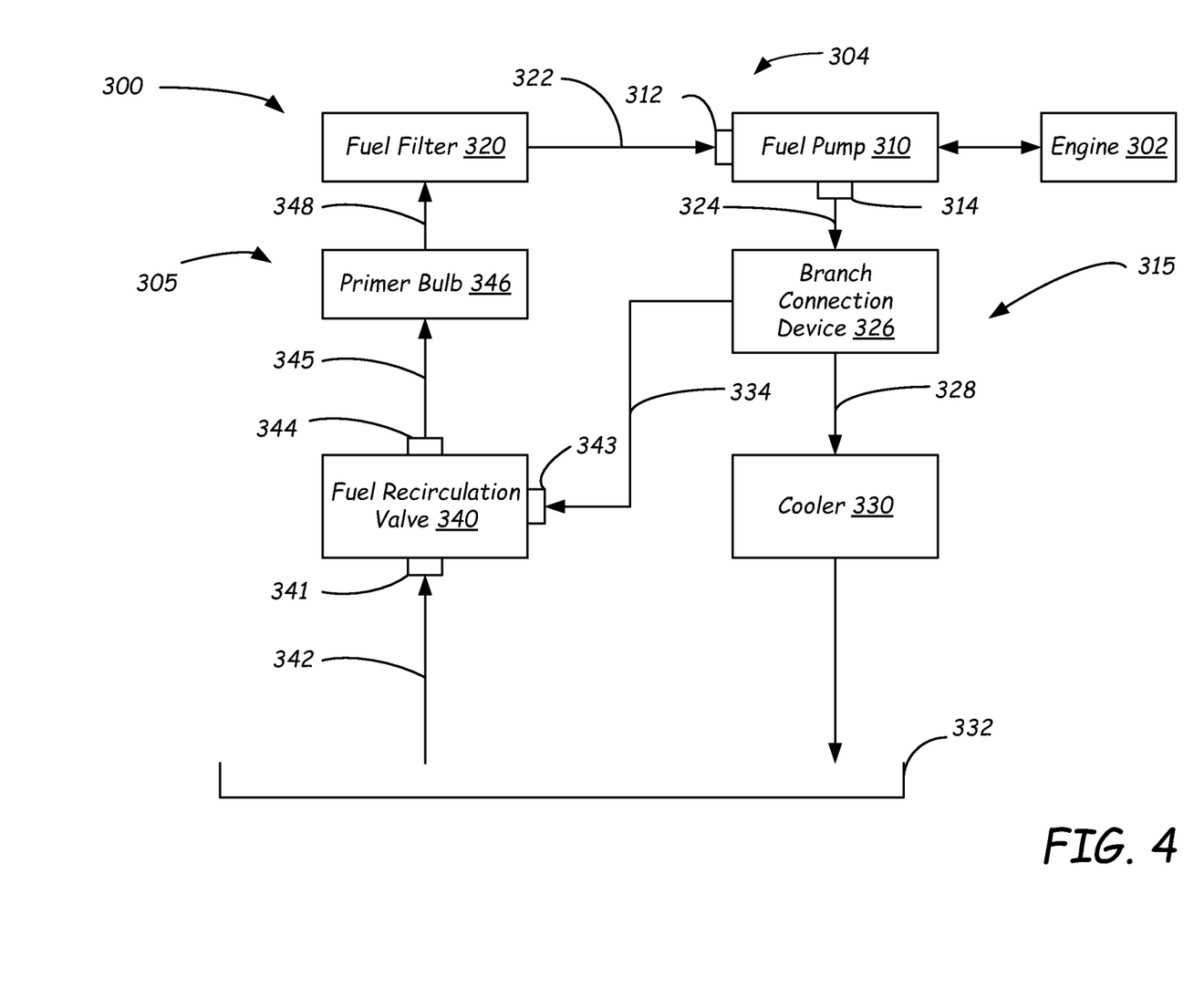
FIG. 4 is a diagrammatic illustration of a fuel delivery circuit included with a diesel engine in accordance with exemplary embodiments.

FIG. 4 is a diagram of a portion of a power system 300 of the type that can be used with power machines such as power machines 100 and 200 discussed above according to one illustrative embodiment. Power system 300 includes a diesel engine 302 and a fuel supply circuit 304 for supplying fuel to the engine 302. As shown in FIG. 4, circuit 304 includes a fuel pump 310 that receives fuel from an input path 305 at a first inlet 312 and returns fuel from the engine via a first outlet 314 through an outlet path 315. Other inlets and/or outlets of pump 310, for example those in communication with engine 302, are not discussed here. Pump inlet 312 receives fuel from a pump inlet line 322 that is connected directly to, or in series with, an output of a fuel filter 320. A certain portion of the fuel that is provided to the engine 302 is not burned, but is returned to the fuel pump 310. This unused fuel is returned by pump 310 through pump outlet 314 coupled to a pump outlet line 324. The returned unused fuel is warmed by its passage through the engine 302. A branch connection device 326 such as a tee is coupled to pump outlet line 324 splits the returning fuel between a pump return line 328 and a fuel recirculation valve input line 334 that is in communication with a fuel recirculation valve 340. Fuel not returned to the fuel recirculation valve 340 is returned to a fuel tank or reservoir 332 through pump return line 328 via a cooler 330 in some embodiments, although other embodiments may not have a cooler. Fuel recirculation valve 340 includes a first inlet 341 in communication with a fuel tank 332 via a fuel tank inlet line 342. Fuel recirculation valve 340 also includes a second inlet 343 in communication with fuel recirculation input line 334. An outlet 344 of the fuel recirculation valve 340 is coupled to an output line 345 in fluid communication with an input line 348 of fuel filter 320. In some embodiments, a primer bulb or other device 346 can be included between fuel recirculation valve 340 and fuel filter 320 to at least initially encourage flow of fuel from fuel recirculation valve 340 into fuel filter 320. In other embodiments, no primer bulb is provided. The fuel supply circuit 304 is one example of a fuel supply circuit that can incorporate fuel recirculation circuits and fuel recirculation valves of the type discussed herein. Other fuel supply circuits can have different components or arrangements of components that are not part of the specific portions of the fuel supply circuits that make up the fuel recirculation schemes that are part of this disclosure.

The fuel recirculation valve 340 operates in the fuel supply circuit 304 to receive fuel from two different sources (i.e. a fuel tank and a return from an engine), mix the fuel, and provide the mixed fuel to the engine. In the fuel supply circuit 304 shown in FIG. 4, the fuel recirculation valve 340 is advantageously located upstream from the fuel filter 320 so that mixed fuel is provided to the inlet of the filter. Fuel returned from the engine is already filtered and is usually warmer than fuel provided from the fuel tank.

It is known that at low temperatures, diesel fuel can become cloudy as paraffin in the fuel tends to solidify. A portion of the return fuel from the engine, being warmer than fuel from the fuel tank, is advantageously mixed with fuel from the tank to provide a warmer fuel to the fuel filter 320 and, eventually, the engine 302. By mixing the fuel prior to the fuel filter 320, warmer fuel is provided to the filter, advantageously reducing the possibility of clogging the filter with paraffin. While it is advantageous to provide fuel above a certain temperature to reduce the likelihood of paraffin solidifying in the fuel and clogging the filter, it is also known that when fuel gets too hot, it can damage the engine. Therefore, as described below, the fuel recirculation valve 340 has a valve element to selectively provide or meter the amount of return fuel that is provided for mixing with fuel from the fuel tank to reduce, when necessary, the temperature of the fuel provided to the engine.

Figure 5:
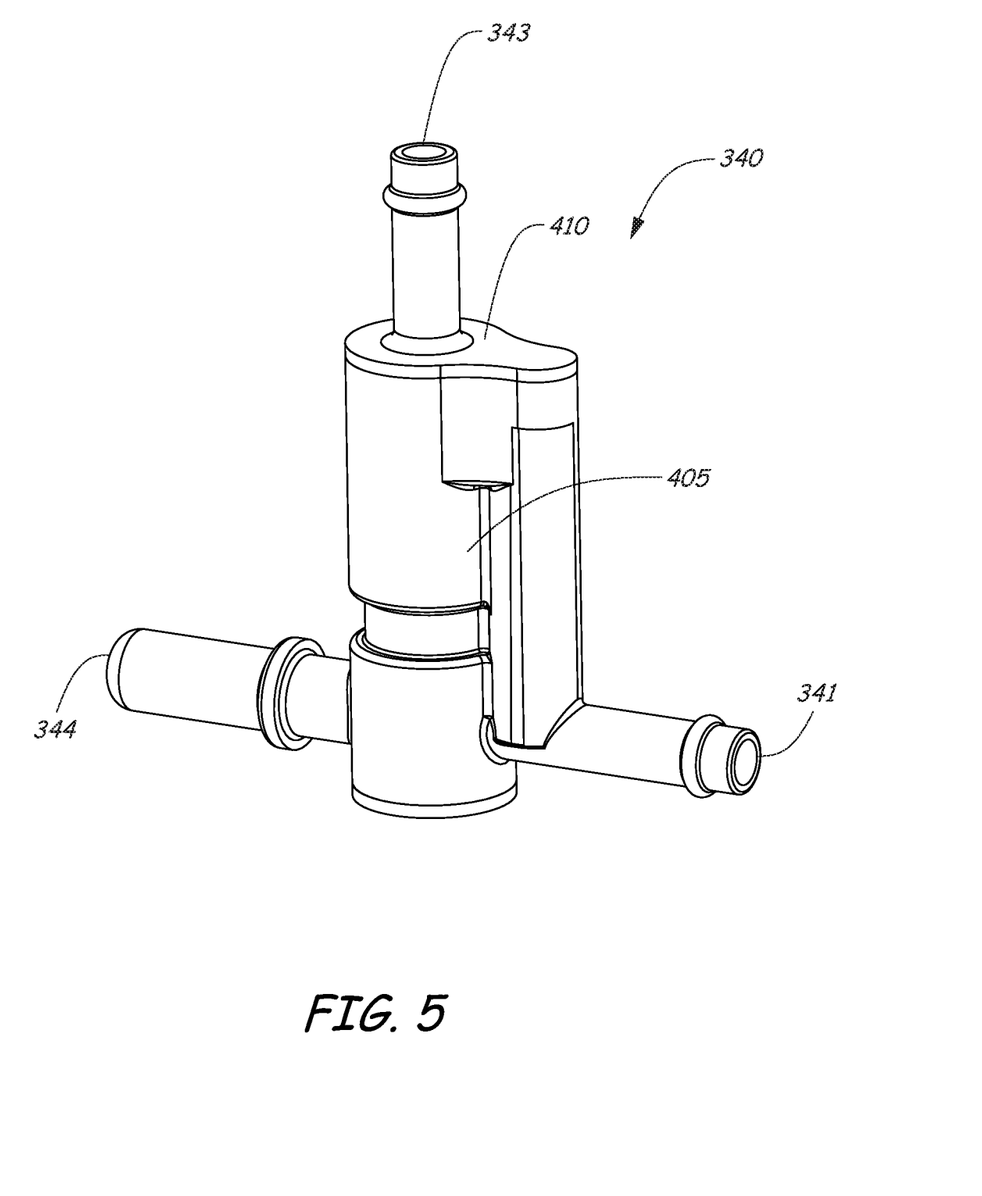
FIG. 5 is perspective view of a fuel recirculation valve from the fuel recirculation circuit shown in FIG. 2 in accordance with exemplary embodiments.

FIG. 5 is a perspective illustration of a fuel recirculation valve 340 according to one illustrative embodiment. In one example embodiment, fuel recirculation valve 340 includes a main housing portion or body 405 and a top portion or cap 410 that is attached to the body. Body 405 includes the inlet 341 and the outlet 344 of the fuel recirculation valve 340 through which fuel from the fuel tank 332 is received and provided downstream in the fuel supply circuit. The second inlet 343, in this embodiment, is formed into cap 410 (although it need not be) to provide a path for return fuel from the engine 302 into the fuel recirculation valve. Outlet 344 is configured to be coupled in fluid communication, either directly or through elements such as an actuating element (e.g. primer bulb 346), to the inlet of fuel filter 320.

Figure 6:
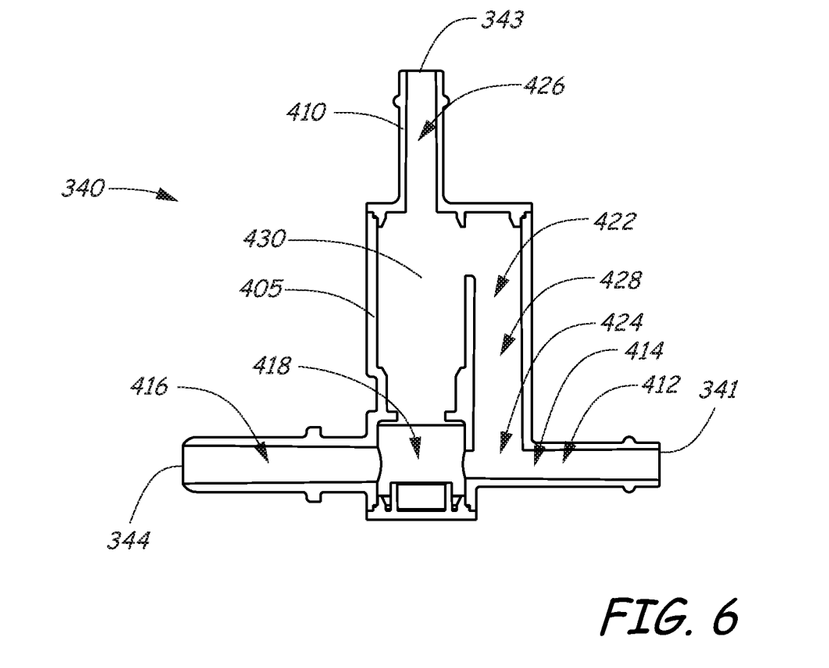
FIG. 6 is a cross-sectional view of the body of the recirculation valve shown in FIG. 5 with the valve element removed.
Figure 6A:
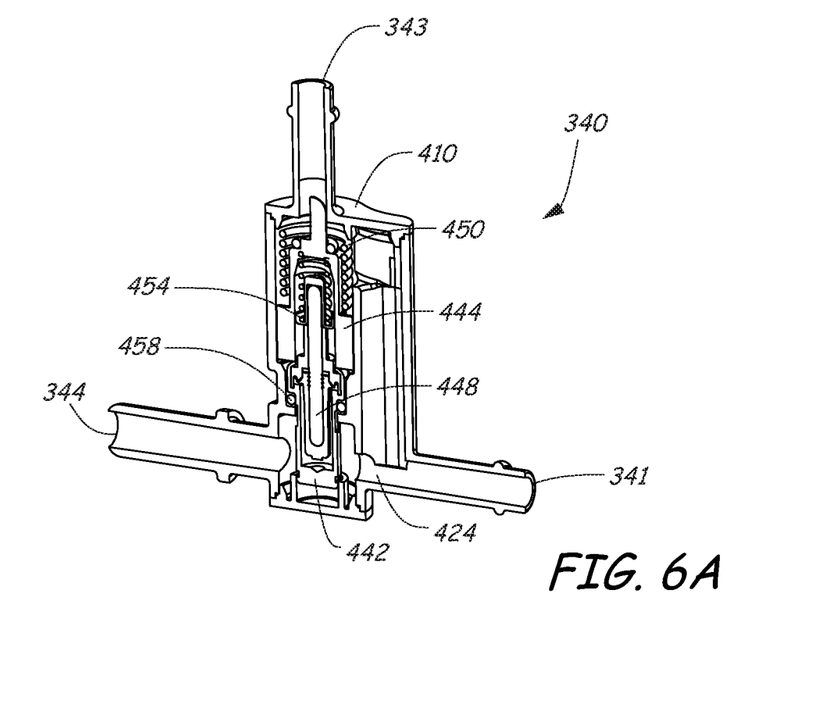
FIG. 6A is a cross-section of the fuel recirculation valve shown in FIG. 5 and taken in perspective view showing the valve element.
Figure 7:
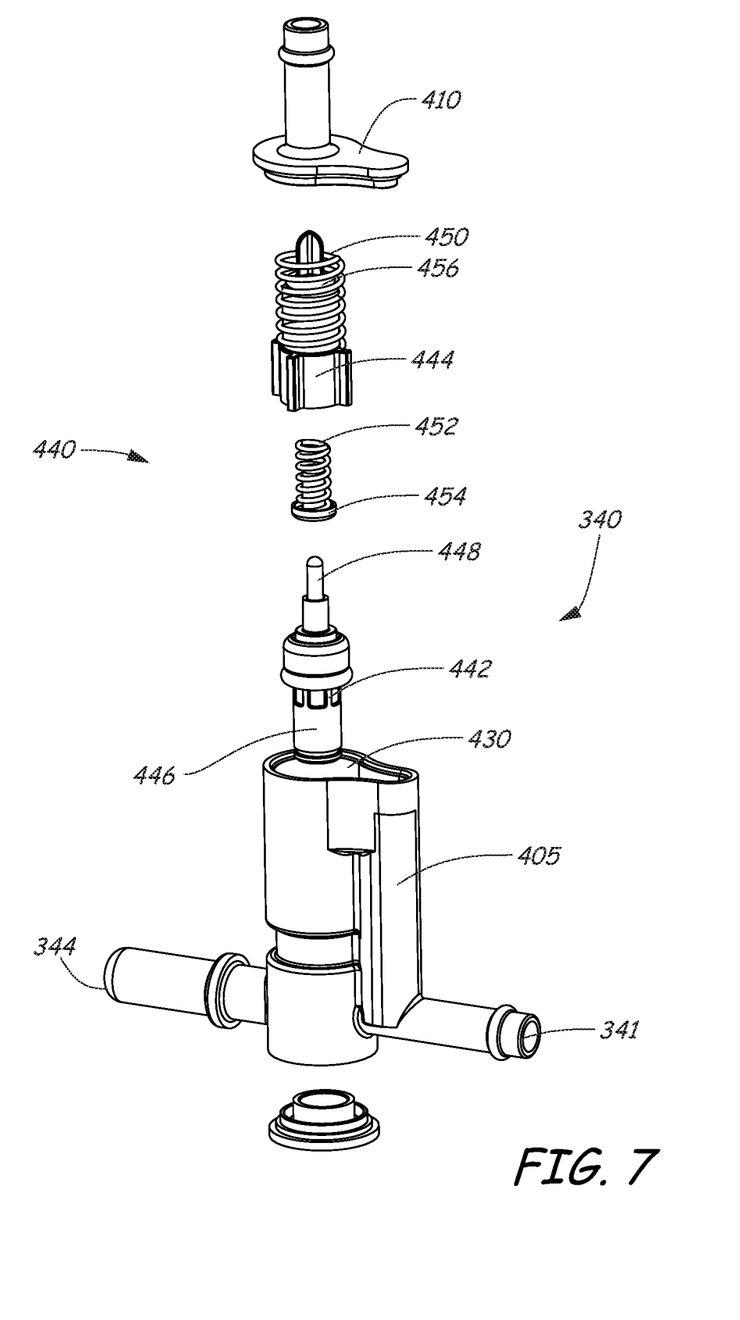
FIG. 7 is an exploded perspective view of the fuel recirculation valve shown in FIGS. 3 and 4 in accordance with exemplary embodiments.

FIGS. 6, 6A, and 7 provide detailed illustrations of fuel recirculation valve 340 in accordance with exemplary embodiments. FIG. 6 shows a cross-section of a portion of the fuel recirculation valve 340 including the body 405 and the cap 410 with internal components removed, FIG. 6A shows a perspective view of fuel recirculation valve 340 in cross section, and FIG. 7 is an exploded perspective view of the valve. The body 405 includes a passage 412 between the first inlet 341 and the outlet 344. Passage 412 has an inlet portion 414, an outlet portion 416, and a middle portion 418 between the inlet portion and the outlet portion. The middle portion 418 is widened to allow a temperature sensitive actuator 442 to be seated within the passage 412 without completely blocking the passage. That is, fuel is allowed to pass around the temperature sensitive actuator 442 as it moves through middle portion 418 of the passage 412. As will be discussed below, as the fuel passes around the temperature sensitive actuator 442, the temperature sensitive actuator responds to the temperature of the fuel.

The fuel recirculation valve 340 also includes a return path 422 that extends from the second inlet 343 to a node 424 at which the return path joins the inlet portion 414 of passage 412. The return path includes a first portion 426 and a second portion 428, the first portion having a first end in communication with the second inlet 343 and the second portion 428 being in communication with the with the passage 412 at node 424. In between the first portion 426 and the second portion 428 is a valve cavity 430 in which a valve member or actuator 440 (shown in FIG. 7) is placed to be selectively actuated to allow return fuel into the second portion 428. The valve member, as will be discussed in more detail below, is moveable based on fuel temperature to regulate the amount, if any, of return fuel that is provided into the second portion 428 and eventually be mixed with fuel from the tank at node 424.

FIGS. 6A and 7 show the fuel recirculation valve 340 including the valve member or actuator 440 that is seated within the valve cavity 430 (shown in an exploded view in FIG. 7). The valve member 440 includes temperature sensitive element 442 and a blocking member 444. The blocking member 444 is moveable within the valve cavity 430 under influence of the temperature sensitive element 442 to regulate the amount of return fuel that passes from the first portion 426 to the second portion 428 of the return path 422. The temperature sensitive element 442 has a body 446 with a temperature sensitive material such as wax located within the body that expands as the temperature expands to act against a plunger 448. As the temperature sensitive material expands, the plunger 448 extends out of the body 446 to act against the blocking member 444. The blocking member 444 is biased to an open or unactuated position by a biasing member 450, which is a spring that acts against the cover 410 and the blocking member 444. A spring 452 acts against the blocking member 444 and a collar 454 that is solidly coupled to the plunger 448. The spring rate of spring 452 is such that it allows the plunger 448 to move the blocking member 444 against biasing member 450 until the blocking member 444 is fully seated in a closed or actuated position and also collapse to allow the plunger to over travel within the valve member so that the valve body 405 and the connection between the valve body and the cover 410 is not compromised. A first sealing member 456 is provided to seal first portion 426 when the blocking member 444 is fully extended in a fully actuated position toward the first portion to prevent fuel from moving from the first portion to the second portion 428 of the return path 422. A second sealing member 458 is provided to prevent fuel flow between the valve cavity 430 and the middle portion 418 of the passage 412. In the embodiments shown herein, first and second sealing members are O-rings. In other embodiments, other types of sealing members can be used.

Figure 8:
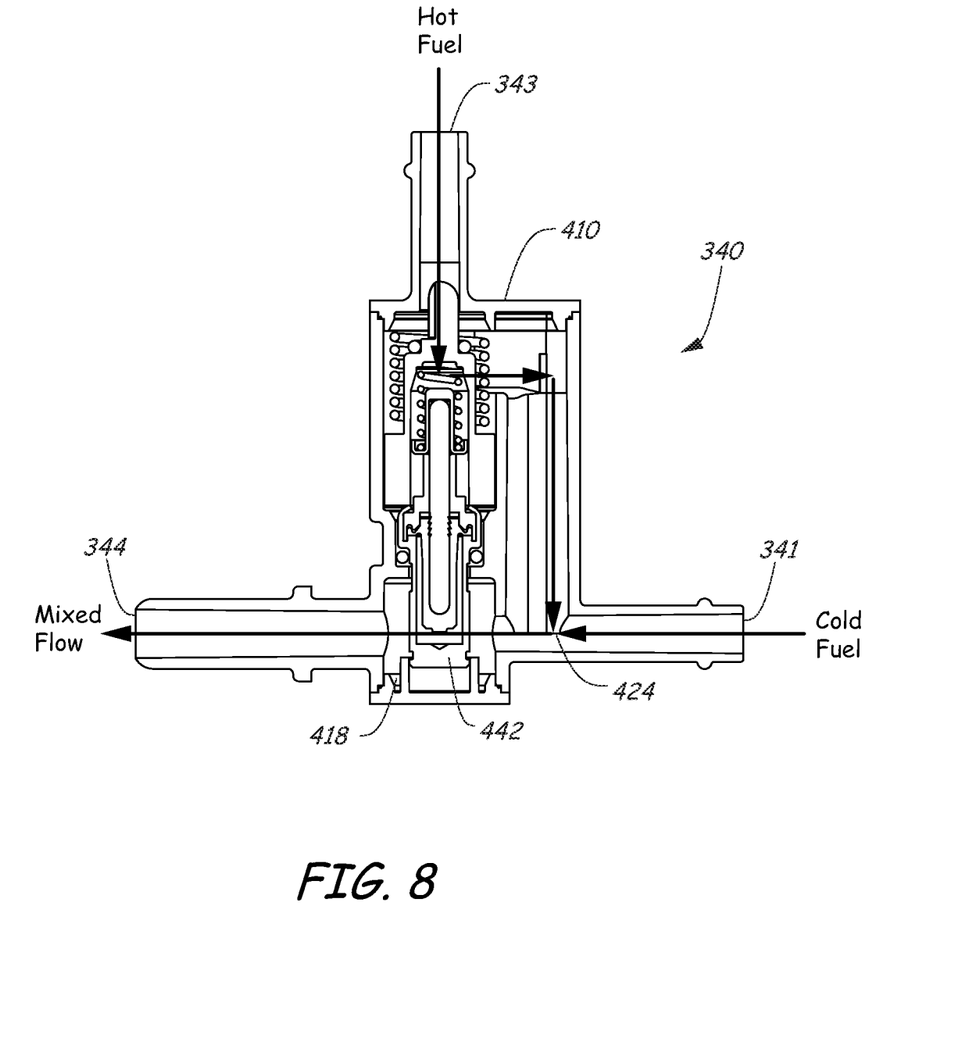
FIG. 8 is a cross-sectional side view of the recirculation valve shown in FIGS. 3-5 and illustrating mixing of fuel recirculated from the engine and fuel from the fuel tank.

In operation, as shown in FIG. 8, the fuel recirculation valve 340 operates to allow return fuel (identified as "Hot Fuel") to mix with fuel from the tank (shown as "Cold Fuel") to mix at node 424, prior to entering the middle portion 418 of the passage 412. By mixing the fuel prior to entering the middle portion 418, the actuator is controlled by sensing the mixed temperature and not the temperature of the returned fuel, thereby provided a better control of the temperature of the fuel being provided to the filter and then to the engine.

The disclosed fuel recirculation valve embodiments also advantageously mix the fuel supplies in the fuel recirculation valve before encountering the actuator. By mixing the fuel prior to encountering the filter, the disclosed fuel recirculation valves can be added to any fuel system with any fuel filter and placed in the fuel supply circuit prior to (upstream of) the fuel filter. In addition, because the fuel is mixed before, instead of in, the filter, the likelihood that cold fuel would be introduced into the filter, and thereby plug the filter or at least part of it, is minimized. This is particularly important in the first moments after the engine 302 is started in a cold weather application.

Although the present invention has been described with reference to preferred embodiments, workers skilled in the art will recognize that changes may be made in form and detail without departing from the spirit and scope of the invention. For example, while in example embodiments a wax element type of temperature element is shown, in other embodiments other types of temperature elements can be used to move a valve element responsive to, or as a function of, temperature of a mixed flow in order to restrict or stop a flow of hot fuel into the mixing region. Other such modifications are also within the scope of this disclosure.

What is claimed is:

1. A fuel recirculation valve for use in a fuel supply circuit that supplies filtered fuel to an engine, comprising:
   a body including:
   a first inlet configured to receive fuel into the body from a first source;
   a second inlet configured to receive fuel into the body from a second source separate from the first source;
   a single outlet configured to allow fuel to exit the body and be provided to a filter that is external to the body, wherein the body is configured such that fuel from the first source and the second source can only exit the body through the outlet;
   a first passage connecting the first inlet to the outlet, the first passage having a first portion in communication with the first inlet, a second portion in communication with the outlet and a middle portion between the first portion and the second portion, the first passage providing a path for fuel from the first source to travel from the first inlet to the outlet;
   a second passage connecting the second inlet to the first passage at a node positioned between the first inlet and the middle portion of the first passage, the second passage providing a path for fuel from the second source to travel from the second inlet to the node so that fuel from the second source is capable of being mixed with the fuel from the first source at the node; and
   an actuator located within the first passage, the actuator having an unactuated position and an actuated position, and wherein when the actuator is in the actuated position, fuel from only the first source is received into the body and exits through the outlet, wherein the actuator blocks the second passage to prevent fuel from traveling from the second inlet to the node such that fuel cannot be received into the body from the second source at the second inlet and exit the body through the outlet, and wherein when the actuator is in the unactuated position, fuel from both of the first and the second sources are received into the body and exit through the outlet.

2. The fuel recirculation valve of claim 1, wherein the actuator includes a temperature sensitive element positioned within the middle portion of the first passage, the temperature sensitive element being capable of being in communication with fuel in the middle portion of the first passage and wherein the temperature sensitive element causes the actuator to move between the unactuated and the actuated position.

3. The fuel recirculation valve of claim 2, wherein the body has a cavity in which the actuator is seated and wherein in the actuated position, a portion of the actuator extends into the second passage to block flow of fuel from the second inlet to the node.

* * * * *